United States Patent [19]
Weber

[11] 3,729,912
[45] May 1, 1973

[54] SNAP ON SHROUD MOUNTING

[75] Inventor: Edwin J. Weber, Baltimore, Md.

[73] Assignee: The Black and Decker Manufacturing Company, Towson, Md.

[22] Filed: Sept. 14, 1970

[21] Appl. No.: 71,634

[52] U.S. Cl. .................56/320.1, 15/79, 310/89
[51] Int. Cl. ..........................................A01d 67/00
[58] Field of Search...............56/16.7, 17.5, 11.9, 56/320.1, 320.2; 310/88, 89; 15/79

[56] References Cited

UNITED STATES PATENTS

| | | | |
|---|---|---|---|
| 3,212,244 | 10/1965 | Wilgus | 56/320.1 UX |
| 2,597,735 | 5/1952 | Jepson | 56/11.9 X |
| 3,144,258 | 8/1964 | Ottosen et al. | 56/320.2 X |
| 3,581,480 | 1/1971 | O'Connor et al. | 56/11.9 |
| 3,451,087 | 6/1969 | Jepson et al. | 310/89 X |
| 2,909,885 | 10/1959 | Smith | 56/11.9 |
| 1,727,849 | 9/1929 | Wise et al. | 310/89 |

FOREIGN PATENTS OR APPLICATIONS

| | | | |
|---|---|---|---|
| 855,938 | 11/1970 | Canada | 56/16.7 |

Primary Examiner—Hugh R. Chamblee
Assistant Examiner—J. A. Oliff
Attorney—Leonard Bloom and Joseph R. Slotnik

[57] ABSTRACT

A lawnmower including a frame supported for movement over the ground by ground engaging wheels. A rotatable reel is mounted on the frame and cooperates with a bed knife. The reel is driven by a D.C. motor powered by a storage battery, both of which are disposed on the frame and covered by a shroud attached to the frame. The shroud serves to protect the motor and battery and is readily detachable from the frame for servicing of the motor and/or battery.

4 Claims, 4 Drawing Figures

Patented May 1, 1973
3,729,912
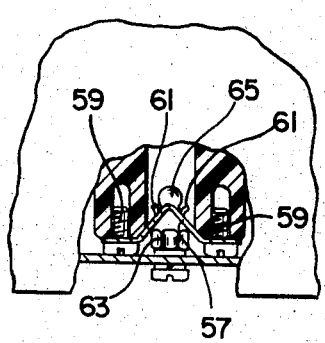
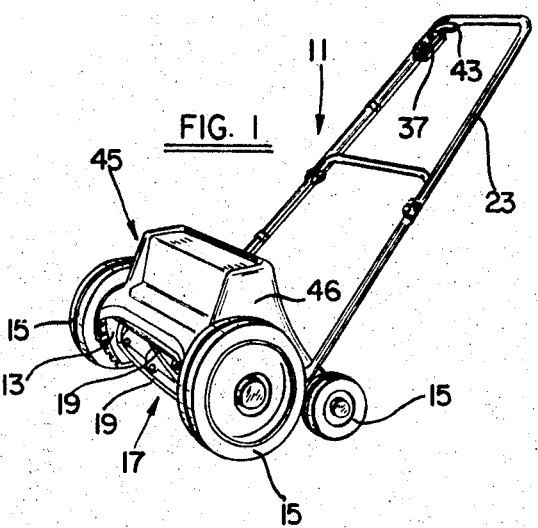
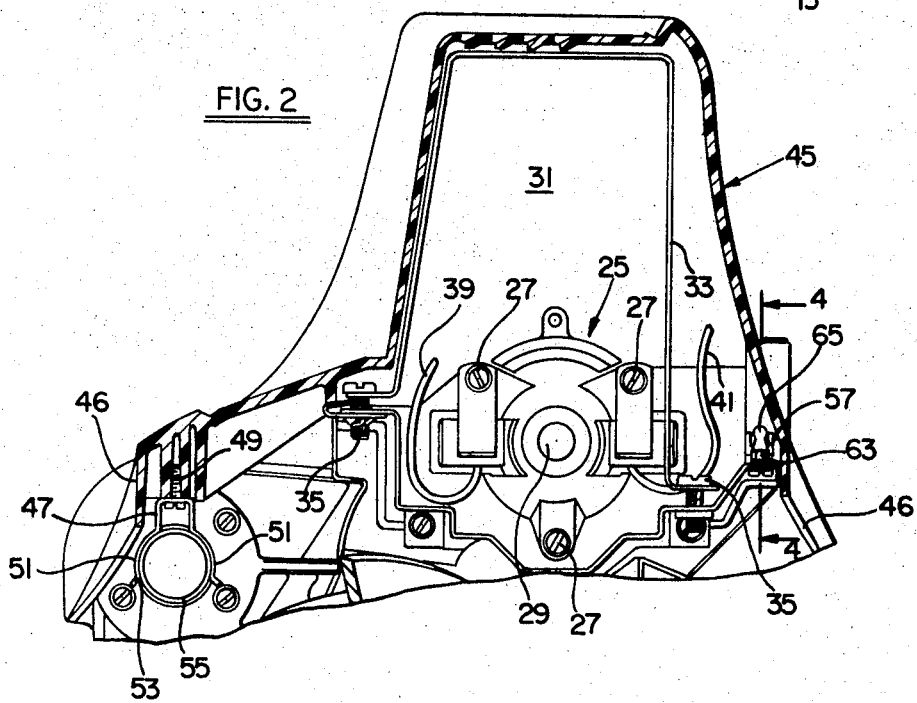
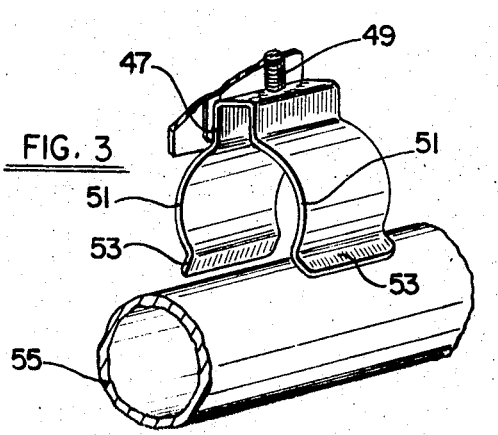
INVENTOR.
EDWIN J. WEBER
BY

SNAP ON SHROUD MOUNTING

SUMMARY OF THE INVENTION

The present invention is directed to an improved shroud construction adapted to encase and protect a motor and battery on a cordless electric lawnmower. Desirably, the shroud is quickly and easily removable and replaceable without requiring special tools so that the motor and/or battery can be serviced, and is constructed to withstand normal impact forces during mower use without becoming damaged.

Main objects of the present invention, therefore, are to provide a shroud construction for the motor and battery of a cordless electric lawnmower which construction encloses and protects the motor and battery, is quickly and easily removable and replaceable, without special tools, for purposes of servicing the motor and/or battery, and is adapted to withstand normal impact and shock forces arising during use without becoming damaged.

Further important objects of the invention are to provide an improved shroud construction of the above character which presents a neat and aesthetically pleasing external appearance, is relatively inexpensive to manufacture, durable in construction, and reliable in use.

Other objects of advantages of the invention will become more apparent from a consideration of the detailed description to follow taken in conjunction with the drawings annexed hereto.

BRIEF DESCRIPTION OF THE DRAWINGS

FIG. 1 is a perspective view of a cordless lawnmower embodying the present invention;

FIG. 2 is an enlarged sectional view of a portion of the lawnmower of FIG. 1 and illustrating the present invention;

FIG. 3 is an exploded perspective view illustrating one attachment means for the shroud of the present invention; and FIG. 4 is an enlarged sectional view of FIG. 2 taken along the line 4—4 thereof and showing another of the attachment means.

BROAD STATEMENT OF THE INVENTION

Broadly described, the present invention relates to an electric lawnmower construction comprising a frame supported for movement over the ground by wheels, cutting blade means rotatably supported upon said frame, a D.C. motor supported upon said frame and having an output shaft operatively interconnected with said blade means, a storage battery supported atop said frame and interconnected with said motor, a shroud enveloping said battery, cooperable detent means on said frame and said shroud and forming the sole means holding said shroud on said frame, said detent means being releasable by manually grasping and pulling said shroud away from said frame, said shroud being wholly detachable and removable from said frame.

In still another aspect, the present invention relates to a lawnmower of the type including a frame supported for movement over the ground, cutting means rotatably supported upon said frame, a D. C. motor supported upon said frame and adapted to drive said cutting means, a storage battery supported atop said frame and electrically connected to said motor; the improvement which comprises a shroud encasing said battery and extending forwardly of said frame, means connecting said shroud to said frame, said connecting means being flexible and allowing said shroud to move longitudinally relative to said frame in the direction of travel of said mower when said shroud encounters an obstacle, said connecting means constituting the sole connecting means for said shroud to said frame and releasing when said shroud moves significantly relative to said frame.

DETAILED DESCRIPTION

Referring now specifically to the drawings, a lawn mower embodying the present invention is illustrated generally at 11 in FIG. 1 and is seen in FIGS. 1 and 2 to include a frame 13 supported for movement over the ground by a plurality of wheels 15. A reel 17 comprising a plurality of cutting blades 19 is rotatably supported upon the frame 13 and cooperates with a stationary bed knife (not shown) to cut grass. A generally U-shaped handle 23 extends upwardly and rearwardly from the frame 13 and facilitates manual manipulation and control of the mower 11.

The reel 17 is powered by a D.C. motor 25 supported upon the frame 13 and fixed thereto by bolts 27. The motor 25 has an output rotary shaft 29 interconnected by a suitable transmission (not shown) to the reel. A storage battery 31 is supported upon the frame 13 and is fixed thereto by strap brackets 33 and screws 35. The battery 31 is interconnected with the motor 25 and a switch 37 through leads 39, 41 so that when the switch 37 is closed by a lever 43, the motor 25 is energized and the reel 17 rotated.

A shroud 45 is mounted on the frame 13 over the motor 25 and battery 31 for the purpose of shielding these components from grass and other debris. Furthermore, the shroud 45 has a skirt 46 which extends downwardly around the front, rear, and both sides of the mower frame 13 to enhance the appearance and aesthetic qualities of the mower 11. This shroud 45 desirably is retained in place on the frame 13 but is readily removable therefrom, preferably by manually grasping and pulling it away from the frame 13, for service and/or replacement of the motor 25 or battery 31. For weight and economy purposes, the shroud 45 is constructed of plastic and, in order to prevent damage thereto during mower use, the means by which it is fastened to the frame 13 is constructed to release should the shroud 45 engage or collide with an obstacle during use of the mower 11.

Thus, as seen in FIG. 2, the front of the shroud 45 (the left-hand side as seen in this figure) is provided with a pair of resilient, for example, sheet metal, mounting clips 47 (only one of which is shown) secured thereto by screws 49. Each of the clips 47 is generally U-shaped in configuration and has curved leg portions 51 and outwardly bent entrant portions 53 which are adapted to snap over and releasably grip a stabilizer bar 55 fixed to the frame 13.

The rear of the shroud 45 has a pair of resilient sheet metal spring catch members 57 (only one of which is shown) fixed thereto by screws 59 and each of which has an opening formed therein by lanced tabs 61. A pair of nuts 63 are secured to the frame 13 and each has a ball tip 65 adapted to snap into respective ones of the openings in the spring catches 57 in the manner shown in FIGS. 2 and 4.

The shroud 45 is mounted in place on the frame 13 simply by manually placing the former on the latter and pressing downwardly until clips 47 snap onto bar 55 and ball tips 65 of nuts 63 snap into catches 57. When it is desired to remove the shroud 45, for example to check the fluid level in the battery 31, the user simply grasps the shroud 45 at some convenient place and pulls upwardly thereon to release the clips 47 and catches 57. Furthermore, should the shroud 45, and particularly the front skirt or the top thereof, be pushed against or collide with an obstacle, such as a tree, pole, building, or the like during use of the mower 11, the resilient spring slips 47 and catches 57 flex and release, if necessary, from the bar 55 and nuts 63 so that the shroud 45 "pops" loose from the frame 13. This prevents the shroud 45 from cracking or otherwise being permanently damaged. Thereafter, the shroud 45 is reattached to the frame 13 simply by pressing downwardly on the shroud.

By the foregoing, there has been disclosed a novel, lawnmower shroud mounting assembly calculated to fulfill the inventive objects set forth hereinabove. While a preferred embodiment of this invention has been illustrated and described in detail herein, it will be appreciated that various additions, substitutions, modifications and/or omissions may be made thereto without departing from the spirit of the invention.

I claim:

1. An electric lawnmower construction comprising a frame supported for movement over the ground by wheels, cutting blade means rotatably supported upon said frame and having an output shaft operatively interconnected with said blade means, a storage battery supported atop said frame and interconnected with said motor, a shroud enveloping said battery, cooperable detent means on said frame and said shroud and forming the sole means holding said shroud on said frame, said detent means being releasable by manually grasping and pulling said shroud away from said frame, said shroud being wholly detachable and removable from said frame.

2. A construction as defined in claim 1 wherein said detent means includes means adjacent the forward and rearward end of said shroud in the direction of mower travel, said detent means being flexible in the direction of mower travel, for releasing upon collision of said shroud with an obstacle.

3. A construction as defined in claim 1 wherein said detent means is constructed to guide its components into cooperative engagement when said shroud is pushed toward said frame.

4. In a lawnmower of the type including a frame supported for movement over the ground, cutting means rotatably supported upon said frame, a D. C. motor supported upon said frame and adapted to drive said cutting means, a storage battery supported atop said frame and electrically connected to said motor; the improvement which comprises a shroud encasing said battery and extending forwardly of said frame, means connecting said shroud to said frame, said connecting means being flexible and allowing said shroud to move longitudinally relative to said frame in the direction of travel of said mower when said shroud encounters an obstacle, said connecting means constituting the sole connecting means for said shroud to said frame and releasing when said shroud moves significantly relative to said frame.

* * * * *